(No Model.) 3 Sheets—Sheet 1.

G. BAUSCH.
CAMERA.

No. 438,834. Patented Oct. 21, 1890.

Witnesses:
T. T. Denison
W. B. Green

Inventor:
George Bausch
By his attorneys
Smith & Denison (No Model.) 3 Sheets—Sheet 2.

G. BAUSCH.
CAMERA.

No. 438,834. Patented Oct. 21, 1890.

Witnesses:
F. F. Denison
H. B. Green.

Inventor:
George Bausch
By his Attorneys
Smith & Denison (No Model.) 3 Sheets—Sheet 3.

G. BAUSCH.
CAMERA.

No. 438,834. Patented Oct. 21, 1890.

UNITED STATES PATENT OFFICE.

GEORGE BAUSCH, OF SYRACUSE, NEW YORK.

CAMERA.

SPECIFICATION forming part of Letters Patent No. 438,834, dated October 21, 1890.

Application filed November 7, 1889. Serial No. 329,563. (No model.)

*To all whom it may concern:*

Be it known that I, GEORGE BAUSCH, of Syracuse, in the county of Onondaga and State of New York, have invented new and useful Improvements in Cameras, of which the following, taken in connection with the accompanying drawings, is a full, clear, and exact description.

This invention relates to photographic apparatus and cameras, and especially to the devices for holding a multiple number of plates within the camera ready for instant use and to mechanisms for disposing of one plate after exposure ready for the succeeding plate.

The object of my invention is to provide a camera with a multiple number of plates all ready for exposure and to provide means for dropping an exposed plate out of the way instantly, leaving the succeeding plate ready for exposure, the whole camera being dark, and the plate-holders being also provided with means for preventing the light from striking the plate before exposure and after.

My invention consists in the several novel features of construction and operation hereinafter described, and specifically set forth in the claims annexed.

It is constructed as follows, reference being had to the accompanying drawings, in which—

Figure 1:
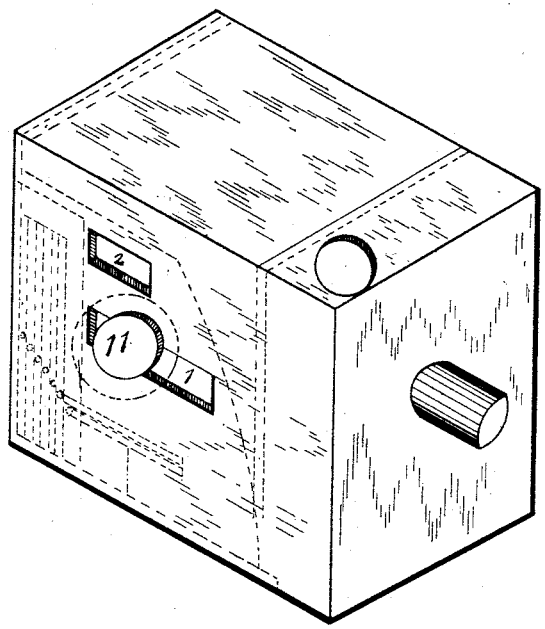
Figure 2:
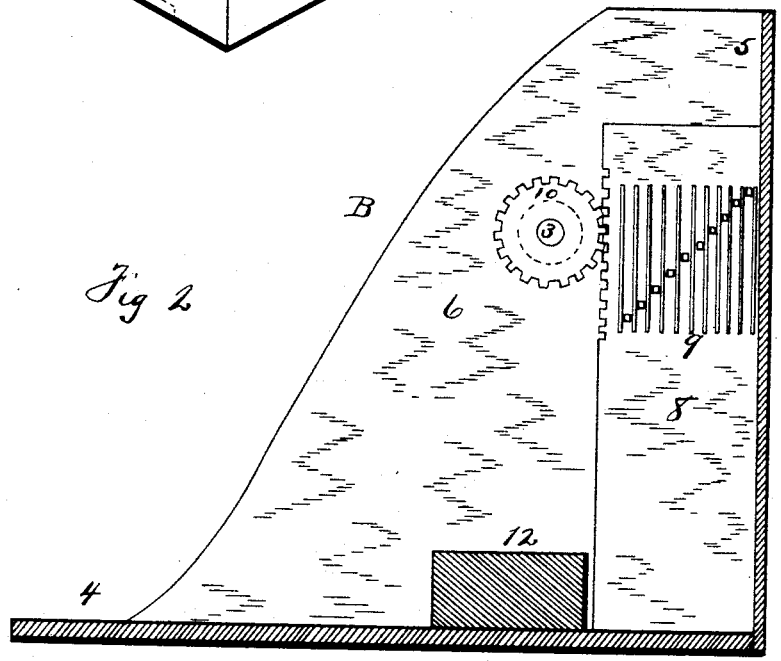
Figure 3:
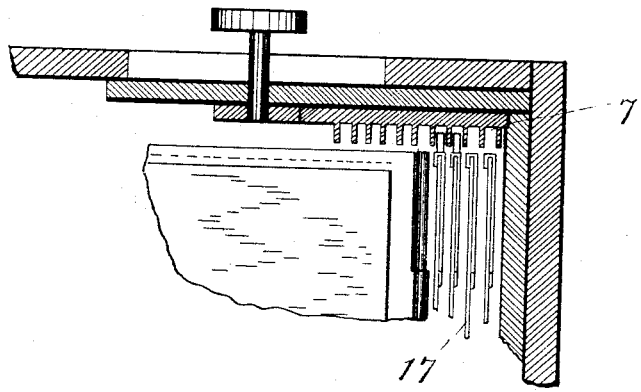
Figure 5:
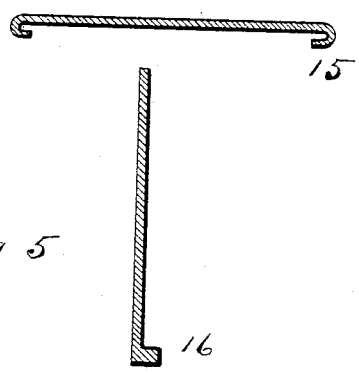
Figure 4:
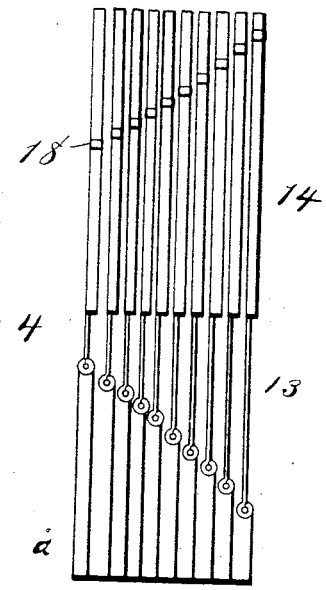
Figure 6:
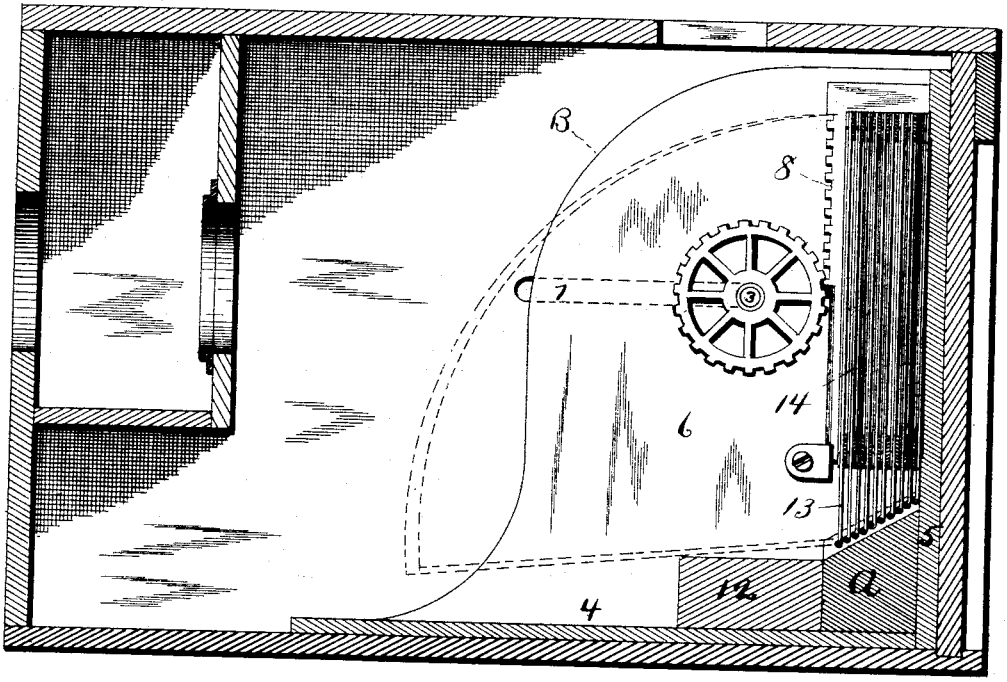

Figure 1 is an isometrical elevation. Fig. 2 is a vertical sectional elevation of the plate-holder, showing a plan of the plate-holding rack and the pinion by which it is raised or lowered. Fig. 3 is a sectional elevation of a part of the camera and of the plate-holder, showing a top plan of the plate in position before exposure and part of the plates dropped down after exposure. Fig. 4 is a side elevation of the plate-holding mechanism detached. Fig. 5 shows, respectively, a horizontal section and a vertical section of the plate-holder proper. Fig. 6 is a longitudinal sectional view of the camera, showing the path of the plate in dotted lines after exposure.

A is the body of the camera, provided in one side with a slotway 1 and above that with a smaller slotway 2, the slotway 1 permitting the plate-holder to be moved forward or back to focus any plate, the shaft 3 passing loosely through the slotway and closely through the plate-holder, as hereinafter described, and the slotway 2 being the ordinary focal slotway and plate-indicator.

The plate-holder B consists of a bottom 4, a back 5, and one vertical side 6, and the back being grooved, as at 7, to receive one edge of the rack-bar 8. This rack-bar is provided on its inner face with a series of strips, creating vertical slotways 9 exterior to the face, and 10 is a pinion engaging with the rack and mounted upon the shaft 3 and rotated to raise or lower the rack-bar by the button 11 upon the other end of the shaft 3 and exterior to the camera-body.

On the bottom 4, I secure a transverse bar 12 a little distance in front of the back 5. Between this block and the back I mount or place loosely and removably my plate-carrying mechanism, consisting of a base $a$, built up of any desired number of strips of sufficient length to substantially fill the space between the inner wall of the camera and the like wall of the plate-holder. These sections are secured together and are of varying width or height, so that when placed together they form a series of steps, and their upper ends are hinged to sheets of metal 13, upon the top of which are the plate-holders 14, constructed with inward flanges 15 hooked over, substantially as shown, and provided across the bottom with a straight flange 16, and when the plates 17 are inserted they are supported upon the flange 16 and are held in place by the flanges 15.

Upon one edge of each plate-holder I secure a stud 18 in such manner that when these holders are mounted these studs project in a series of steps, substantially as shown in Fig. 4, and each stud enters a slotway 9, and so long as it is engaged with said slotway holds the plate-holder and plates in a vertical position. Then, when any plate has been exposed, in order to present another plate for exposure I turn the button 11 so as to raise the rack-bar 8 until the studs 18 of the exposed plate are clear from its slotway, and then the released plate will drop over onto the cross-bar 12 and lie thereon or be supported thereby above the bottom of the plate-holder B, and the next plate is ready for exposure.

The body of the camera can be kept dark by any ordinary means, and strips of felt may be secured upon the plate-carriers around the edges, filling the space between the carriers at all times and shutting out the light.

What I claim is—

1. The combination, with the camera and the plate-holder therein, of multiple plate-carriers hinged to a common base, and each provided with a side stud engaging with a vertical slot upon a rack-bar, and means for raising and lowering said rack-bar, as set forth.

2. The combination, with a vertically-movable rack-bar provided with slotways exterior to its internal face and means for moving said rack-bar vertically, of multiple plate-holders provided with studs arranged in sets and hinged in steps upon a common base, as set forth.

In witness whereof I have hereunto set my hand this 4th day of November, 1889.

GEORGE BAUSCH.

In presence of—
HOWARD P. DENISON,
F. P. DENISON.